United States Patent
Ogata et al.

(10) Patent No.: US 11,733,185 B2
(45) Date of Patent: Aug. 22, 2023

(54) FLUORESCENT X-RAY ANALYSIS APPARATUS COMPRISING A PLURALITY OF X-RAY DETECTORS AND AN X-RAY IRRADIATION UNIT INCLUDING A MULTI-WAVELENGTH MIRROR

(71) Applicant: RIGAKU CORPORATION, Akishima (JP)

(72) Inventors: Kiyoshi Ogata, Tokyo (JP); Sei Yoshihara, Saitama (JP); Shuichi Kato, Tokyo (JP); Kazuhiko Omote, Tokyo (JP); Hiroshi Motono, Tokyo (JP); Naoki Matsushima, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 60 days.

(21) Appl. No.: 17/136,604

(22) Filed: Dec. 29, 2020

(65) Prior Publication Data

US 2021/0116399 A1     Apr. 22, 2021

Related U.S. Application Data

(63) Continuation of application No. PCT/JP2019/018757, filed on May 10, 2019.

(30) Foreign Application Priority Data

Jul. 4, 2018   (JP) ................. 2018-127494

(51) Int. Cl.
*G01N 23/223* (2006.01)
*G01N 23/207* (2018.01)

(52) U.S. Cl.
CPC ....... *G01N 23/223* (2013.01); *G01N 23/2076* (2013.01); *G01N 2223/076* (2013.01);
(Continued)

(58) Field of Classification Search
CPC .. G01N 23/2076; G01N 23/22; G01N 23/223; G01N 2223/076; G01N 2223/61;
(Continued)

(56) References Cited

U.S. PATENT DOCUMENTS 3,925,660 A * 12/1975 Albert ............... H01J 35/30
378/45
4,686,631 A * 8/1987 Ruud ............... G01N 23/207
702/42

(Continued)

FOREIGN PATENT DOCUMENTS

EP    0 523 566 A2    1/1993
JP    5-45307 A1      2/1993
(Continued)

OTHER PUBLICATIONS

International Search Report dated Aug. 6, 2019, issued in counterpart International Application No. PCT/JP2019/018757. (2 pages).

(Continued)

*Primary Examiner* — Allen C. Ho
(74) *Attorney, Agent, or Firm* — WHDA, LLP

(57) ABSTRACT

This fluorescent X-ray analysis apparatus is provided with an X-ray irradiation unit 20 for irradiating a sample S with: X-rays, having an energy that exceeds the energy absorption edge value of Ag which is selected as a measurement target element, and that is no greater than the energy absorption edge value of Sn which is an adjacent element having a higher energy absorption edge value than Ag; and X-rays having an energy exceeding the energy absorption edge value of Sn which is selected as a measurement target element.

6 Claims, 14 Drawing Sheets

(52) U.S. Cl.
CPC .............. *G01N 2223/0766* (2013.01); *G01N 2223/406* (2013.01); *G01N 2223/61* (2013.01); *G01N 2223/611* (2013.01); *G01N 2223/6113* (2013.01); *G01N 2223/6116* (2013.01)

(58) Field of Classification Search
CPC ... G01N 2223/6116; G01N 2223/0766; G01N 2223/406; G01N 2223/611; G01N 2223/6113
USPC .......................................... 378/44–50, 82–85
See application file for complete search history.

(56) References Cited

U.S. PATENT DOCUMENTS

| | | | | |
|---|---|---|---|---|
| 4,817,120 A * | 3/1989 | Pelix | G01N 23/223 | 378/45 |
| 4,852,135 A * | 7/1989 | Anisovich | G01N 23/223 | 378/45 |
| 5,125,016 A * | 6/1992 | Korhonen | G01N 23/207 | 378/197 |
| 5,132,997 A * | 7/1992 | Kojima | G01N 23/223 | 378/49 |
| 5,148,458 A * | 9/1992 | Ruud | G01L 1/25 | 378/70 |
| 5,249,216 A * | 9/1993 | Ohsugi | G01N 23/2206 | 378/90 |
| 5,325,416 A * | 6/1994 | Saito | G01N 23/223 | 378/50 |
| 5,406,609 A * | 4/1995 | Arai | G01N 23/207 | 378/45 |
| 5,414,747 A * | 5/1995 | Ruud | G01N 23/207 | 378/83 |
| 5,457,726 A * | 10/1995 | Miyazaki | G01N 23/223 | 378/45 |
| 5,732,120 A * | 3/1998 | Shoji | G01N 23/225 | 378/45 |
| 5,754,620 A * | 5/1998 | Hossain | G01N 23/223 | 378/45 |
| 5,778,039 A * | 7/1998 | Hossain | G01N 23/20008 | 378/45 |
| 5,937,026 A * | 8/1999 | Satoh | G01N 23/223 | 378/45 |
| 6,023,496 A * | 2/2000 | Kuwabara | G01N 23/223 | 378/45 |
| 6,108,398 A * | 8/2000 | Mazor | G01N 23/223 | 379/49 |
| 6,130,931 A * | 10/2000 | Laurila | G01N 23/223 | 378/45 |
| 6,173,036 B1 * | 1/2001 | Hossain | G01N 23/223 | 378/50 |
| 6,285,506 B1 * | 9/2001 | Chen | G21K 1/06 | 359/708 |
| 6,317,483 B1 * | 11/2001 | Chen | G21K 1/06 | 378/84 |
| 6,353,656 B1 * | 3/2002 | LeVert | G01S 5/18 | 378/70 |
| 6,370,220 B1 * | 4/2002 | Stoop | G01N 23/223 | 378/50 |
| 6,381,303 B1 * | 4/2002 | Vu | G01N 23/20 | 378/90 |
| 6,426,993 B1 * | 7/2002 | Satoh | G01N 23/223 | 378/45 |
| 6,453,002 B1 * | 9/2002 | Mazor | G01N 23/223 | 378/49 |
| 6,522,718 B2 * | 2/2003 | Sato | G01B 15/02 | 378/50 |
| 6,810,106 B2 * | 10/2004 | Sato | G01N 23/223 | 378/50 |
| 6,885,726 B2 * | 4/2005 | Uehara | G01N 23/223 | 378/45 |
| 6,934,359 B2 * | 8/2005 | Chen | G21K 1/06 | 378/45 |
| 7,023,954 B2 * | 4/2006 | Rafaeli | G01N 23/22 | 378/50 |
| 7,035,374 B2 * | 4/2006 | Chen | G21K 1/06 | 378/85 |
| 7,286,633 B1 * | 10/2007 | Hardman | G01N 23/223 | 378/45 |
| 7,356,114 B2 * | 4/2008 | Kataoka | G01B 15/02 | 378/50 |
| 7,412,030 B1 * | 8/2008 | O'Hara | G21K 1/06 | 378/85 |
| 7,440,541 B2 * | 10/2008 | Hubbard-Nelson | G01N 23/223 | 378/45 |
| 7,634,052 B2 * | 12/2009 | Grodzins | G21K 1/06 | 378/90 |
| 7,653,174 B2 * | 1/2010 | Mazor | G01N 23/223 | 378/50 |
| 7,680,243 B2 * | 3/2010 | Yokhin | G01N 23/2206 | 378/45 |
| 7,738,629 B2 * | 6/2010 | Chen | G21K 1/06 | 378/84 |
| 7,983,386 B2 * | 7/2011 | Yellepeddi | G01N 23/223 | 378/70 |
| 7,991,109 B2 * | 8/2011 | Golenhofen | G01N 23/2206 | 378/46 |
| 7,991,116 B2 * | 8/2011 | Chen | G21K 1/06 | 250/503.1 |
| 9,031,187 B2 * | 5/2015 | Yellepeddi | G01N 23/223 | 378/81 |
| 9,291,583 B2 * | 3/2016 | Van Haarlem | G01N 23/223 | |
| 9,389,192 B2 * | 7/2016 | Tokar | G01N 23/223 | |
| 9,449,780 B2 * | 9/2016 | Chen | H01J 35/112 | |
| 9,551,677 B2 * | 1/2017 | Mazor | G01N 23/223 | |
| 9,632,043 B2 * | 4/2017 | Mazor | G01N 23/223 | |
| 9,666,323 B2 * | 5/2017 | Ohashi | H01J 37/244 | |
| 9,829,448 B2 * | 11/2017 | Wormington | G01N 23/223 | |
| 10,184,905 B2 * | 1/2019 | Yasui | G01N 23/223 | |
| 10,256,002 B2 * | 4/2019 | Chen | G01N 23/223 | |
| 10,302,579 B2 * | 5/2019 | Omote | G01N 23/2076 | |
| 10,473,598 B2 * | 11/2019 | Ogata | G01N 23/2204 | |
| 10,514,345 B2 * | 12/2019 | Ogata | G01N 23/223 | |
| 10,895,541 B2 * | 1/2021 | Shchegrov | G01N 23/2273 | |
| 10,908,104 B2 * | 2/2021 | Nakayama | G01N 23/223 | |
| 2017/0284949 A1 | 10/2017 | Omote et al. | | |

FOREIGN PATENT DOCUMENTS

| | | |
|---|---|---|
| JP | H05-052775 A | 3/1993 |
| JP | 5-126768 A | 5/1993 |
| JP | 7-128263 A | 5/1995 |
| JP | 2002-243671 A | 8/2002 |
| JP | 2006-140364 A | 6/2006 |
| JP | 2011-107005 A | 6/2011 |
| JP | 4884553 B1 | 2/2012 |
| JP | 2014-222191 A | 11/2014 |
| JP | 2016-206031 A | 12/2016 |
| JP | 2017-181309 A | 10/2017 |
| NO | 2016/103834 A1 | 6/2016 |

OTHER PUBLICATIONS

Office Action dated Nov. 14, 2022, issued in counterpart JP application No. 2020-528702, with English translation. (12 pages).

* cited by examiner

FLUORESCENT X-RAY ANALYSIS APPARATUS COMPRISING A PLURALITY OF X-RAY DETECTORS AND AN X-RAY IRRADIATION UNIT INCLUDING A MULTI-WAVELENGTH MIRROR

TECHNICAL FIELD

The present invention relates to a fluorescent X-ray analysis apparatus for detecting fluorescent X-rays emitted from an element (measurement target element) selected in advance as a measurement target among a plurality of elements contained in a sample to analyze the measurement target element.

BACKGROUND ART

In connection with increasing integration of semiconductor devices, developments of a three-dimensional mounting technique for laminating a plurality of semiconductor substrates (semiconductor wafers) in the height direction have been recently promoted. In the three-dimensional mounting of such a semiconductor device, protrusions called solder bumps are provided on electrodes formed on the uppermost layer of a semiconductor substrate, and the electrodes of the respective semiconductor substrates are electrically connected via the solder bumps (for example, see Patent Literature 1).

In the manufacturing process of a semiconductor device, there has been a high need for in-situ analysis in the manufacturing process for a thin film formed on a semiconductor substrate as a measurement target. The applicant of this application has proposed a thin film inspection apparatus using X-rays in order to meet this need.

However, in the manufacturing process of the above-mentioned three-dimensionally mounted semiconductor device, there is a new need to add solder bumps to measurement targets as well as the thin film measurement on the semiconductor substrate.

The solder bumps are formed of, for example, lead-free solder having a composition of Sn(0.97) and Ag(0.03). When Sn(tin) and Ag(silver) constituting these solder bumps are measured by fluorescent X-ray analysis, it has been impossible to perform the fluorescent X-ray analysis, particularly, on Ag with high accuracy because the emission amount of fluorescent X-rays emitted from Ag of a low content is small.

Further, when the sample is irradiated with X-rays, not only fluorescent X-rays from the sample are incident to an X-ray detector, but also diffracted X-rays may be reflected and simultaneously incident to the X-ray detector. In this case, the diffracted X-rays incident to the X-ray detector become noise in the fluorescent X-ray analysis, which may deteriorate the measurement accuracy.

Therefore, prior arts of Patent Literature 2 and Patent Literature 3 disclose a technique for rotating a sample to perform an adjustment so that diffracted X-rays are not incident to the X-ray detector.

PRIOR ART LITERATURE

Patent Literature

Patent Literature 1: Japanese Patent Laid-Open No. 2006-140364

Patent Literature 2: Japanese Patent Laid-Open No. H5-126768

Patent Literature 3: Japanese Patent No. 4884553

SUMMARY OF INVENTION

Technical Problem

The present invention has been made in view of the above circumstances, and has an object to provide a fluorescent X-ray analysis apparatus that can highly precisely measure even elements that have been hitherto difficult to be highly precisely measured by prior arts because the contents of the elements are low in samples.

In consideration of the conventional technique disclosed in Patent Literature 1 or 2, the present invention further has an object to provide a high-throughput fluorescent X-ray analysis apparatus that has higher precision and can reduce the measurement time.

Solution to Problem

In order to attain the above objects, according to the present invention, a fluorescent X-ray analysis apparatus comprises an X-ray irradiation unit for irradiating a sample containing a plurality of elements with X-rays, and an X-ray detection unit for detecting fluorescent X-rays emitted from the sample, wherein the X-ray irradiation unit is configured to focus on a measurement target element selected as a measurement target from the plurality of elements contained in the sample and an adjacent element having an energy absorption edge value larger than that of the measurement target element, and irradiate the sample with X-rays having energy values which are larger than the energy absorption edge value of the measurement target element and are equal to or less than the energy absorption edge value of the adjacent element.

When the sample is irradiated with X-rays having energy values which are larger than the energy absorption edge value of the measurement target element and are equal to or less than the energy absorption edge value of the adjacent element, the excitation efficiency of X-rays for the measurement target element is enhanced, and a large amount of fluorescent X-rays are emitted from the measurement target element.

Therefore, it is possible to perform high-accuracy measurement on even elements that are difficult to be measured with high accuracy by the conventional technique due to the low contents thereof in the sample.

Note that there is a case where there exists no adjacent element having a larger energy absorption edge value for some measurement target element of a plurality of measurement target elements selected as measurement targets from the plurality of elements contained in the sample. In this case, the X-ray irradiation unit may be configured to irradiate the sample with X-rays having an energy value larger than the energy absorption edge value of the measurement target element.

By irradiating the sample with such X-rays, the excitation efficiency of X-rays for the measurement target element is enhanced, and a large amount of fluorescent X-rays are emitted from the measurement target element.

For example, in order to use solder containing elements of Ag and Sn as a sample and select each of these elements of Ag and Sn as a measurement target element for measurement, the X-ray irradiation unit may be configured as follows.

The X-ray irradiation unit is configured to irradiate the sample with X-rays having energy values which are larger than the energy absorption edge value of Ag selected as a measurement target element and are equal to or less than the energy absorption edge value of Sn which is an adjacent element having an energy absorption edge value larger than that of the Ag, and X-rays having energy values larger than the energy absorption edge value of Sn selected as a measurement target element.

As a result, even if a substance having a low content of Ag, such as a solder bump, is used as a sample, the excitation efficiency of X-rays in Ag is enhanced, and a large amount of fluorescent X-rays are emitted from Ag. Therefore, for example, it is possible to measure the element of Ag contained in the solder bump with high accuracy.

The above-mentioned X-ray irradiation unit may be realized, for example, by a configuration including an X-ray source for emitting continuous X-rays, and a multi-wavelength mirror for extracting plural types of X-rays having different energy magnitudes upon incidence of the continuous X-rays emitted from the X-ray source to the multi-wavelength mirror.

Here, the multi-wavelength mirror is configured to include a multilayer formed by laminating plural kinds of thin films. The multilayer is configured to diffract only X-rays having desired energy values by adjusting the film thicknesses, film quality, and number of laminated layers of the thin films. Further, the multi-wavelength mirror is configured to diffract plural types of X-rays having different energy magnitudes by laminating plural kinds of multilayers which are different in film thickness, film quality, and the number of laminated layers of the thin films in the depth direction.

Such a multi-wavelength mirror makes it possible to extract, from the continuous X-rays emitted from the X-ray source, X-rays having energy values which are larger than the energy absorption edge value of the measurement target element and are equal to or less than the energy absorption edge value of the adjacent element, and irradiate the sample with the X-rays.

Further, in the present invention, it is preferable that the X-ray detection unit is configured to include a plurality of X-ray detectors.

The plurality of X-ray detectors are arranged around an X-ray irradiation site of the sample to be irradiated with X-rays from the X-ray irradiation unit in such a posture as to take the fluorescent X-rays emitted from the sample. The respective X-ray detectors are configured to be freely movable individually.

Further, the fluorescent X-ray analysis apparatus is configured to further include a controller for moving X-ray detectors having detected diffracted X-rays diffracted from the sample out of the plurality of X-ray detectors to positions to which the diffracted X-rays are not incident.

By configuring the X-ray detection unit as described above, it is possible to avoid the diffracted X-rays diffracted from the sample from entering the X-ray detectors as noise and enhance the S/N. Moreover, the fluorescent X-rays emitted from the sample can be made incident to the plurality of X-ray detectors arranged around the sample to increase the detection intensity of the fluorescent X-rays.

Further, the X-ray detection unit including the plurality of X-ray detectors may also be configured as follows.

The plurality of X-ray detectors are arranged around the X-ray irradiation site of the sample to be irradiated with X-rays from the X-ray irradiation unit in such a posture as to take the fluorescent X-rays emitted from the sample. An X-ray shielding door for shielding X-rays is provided between the sample and each of the X-ray detectors so as to be freely openable and closable.

The fluorescent X-ray analysis apparatus further comprises a controller for closing X-ray shielding doors for X-ray detectors which have detected diffracted X-rays diffracted from the sample among the plurality of X-ray detectors.

Further, the X-ray detection unit including the plurality of X-ray detectors may also be configured as follows.

The plurality of X-ray detectors are arranged around the X-ray irradiation site of the sample to be irradiated with X-rays from the X-ray irradiation unit in such a posture as to take the fluorescent X-rays emitted from the sample. The fluorescent X-ray analysis apparatus is configured to further include an analysis unit for excluding detection signals from X-ray detectors having detected diffracted X-rays diffracted from the sample among the plurality of X-ray detectors, and performing fluorescent X-ray analysis based on detection signals from the other X-ray detectors.

Even when the X-ray detection unit is configured as described above, it is possible to avoid deterioration of the S/N caused by diffracted X-rays and realize highly accurate fluorescent X-ray analysis. Moreover, the fluorescent X-rays emitted from the sample can be made incident to the plurality of X-ray detectors arranged around the sample, thereby increasing the detection intensity of the fluorescent X-rays.

As described above, according to the present invention, when the sample is irradiated with X-rays having energy values which are larger than the energy absorption edge value of the measurement target element and are equal to or less than the energy absorption edge value of the adjacent element, the excitation efficiency of X-rays for the measurement target element is enhanced, and a large amount of fluorescent X-rays are emitted from the measurement target element. Therefore, it is possible to perform high-accuracy measurement on even elements that are difficult to be measured with high accuracy by the conventional technique due to the low contents thereof in the sample.

Further, by configuring the present invention with the X-ray detection unit including the plurality of X-ray detectors as described above, it is possible to eliminate the influence of diffracted X-rays diffracted from the sample and enhance the S/N. Moreover, the fluorescent X-rays emitted from the sample can be made incident to the plurality of X-ray detectors arranged around the sample to thereby increase the detection intensity of the fluorescent X-rays. As a result, it is possible to realize high-throughput fluorescent X-ray analysis that can achieve high accuracy and shorten the measurement time.

REFERENCE SIGNS LIST

10: sample stage,
11: sample positioning mechanism,
20: X-ray irradiation unit,
21: multi-wavelength mirror,
22: multilayer,
30: X-ray detection unit,
31: X-ray detector,
32: X-ray detector drive mechanism,
33: frame,
33a: vacuum chamber,
34: moving table,
35: cooling member,
36: X-ray shielding door,
40: central processing unit,
41: positioning controller,
42: X-ray irradiation controller,
43,44: drive controller,
50: optical microscope,
51: focus controller

DESCRIPTION OF EMBODIMENTS

Embodiments of the present invention will be hereinafter described in detail with reference to the drawings.

In the following embodiments, the configuration of a fluorescent X-ray analysis apparatus suitable for inspecting solder bumps provided on a semiconductor substrate (semiconductor wafer) to be mounted three-dimensionally will be described, but it is needless to say that the application of the present invention is not limited thereto.

First Embodiment

First, a fluorescent X-ray analysis apparatus according to a first embodiment of the present invention will be described with reference to FIGS. 1A to 5.

Figure 1A:
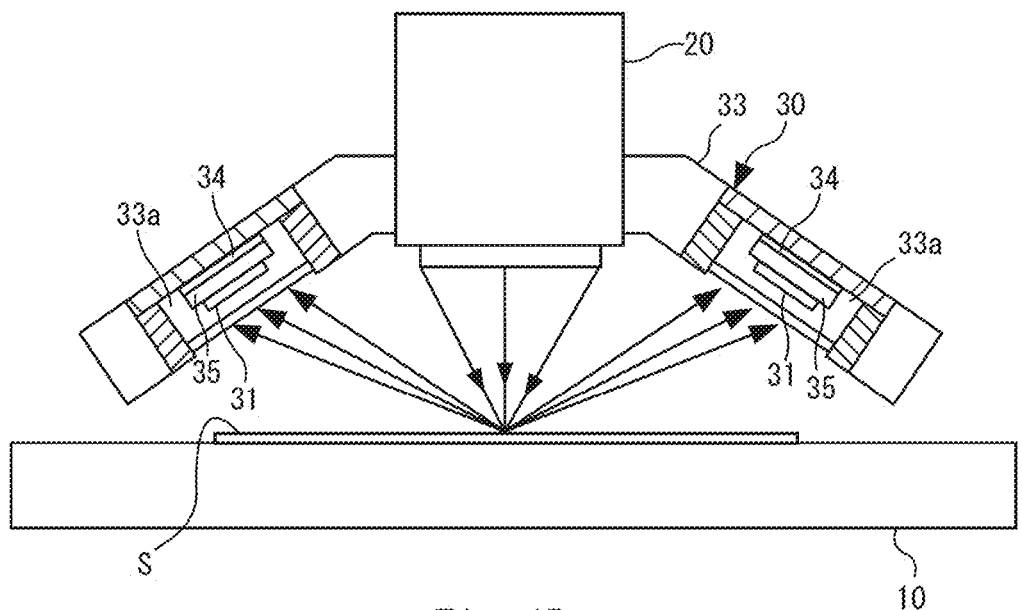
FIG. 1A is a partial cross-sectional front view schematically showing a main part of a fluorescent X-ray analysis apparatus according to a first embodiment of the present invention.
Figure 1B:
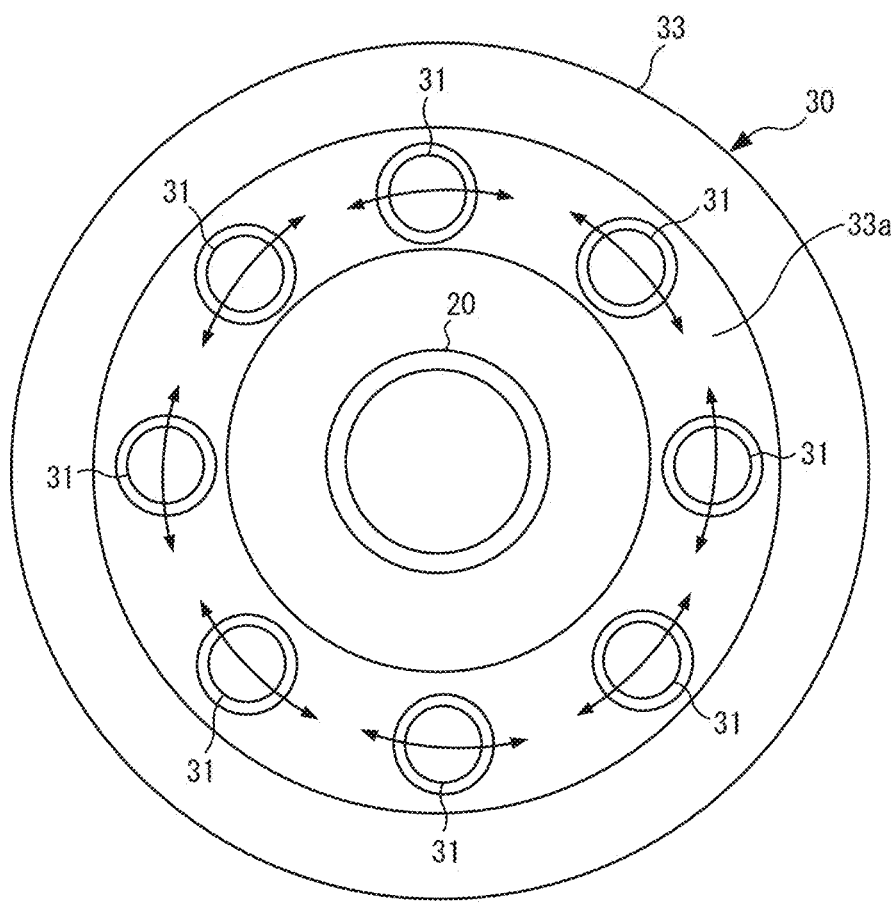
FIG. 1B is also a bottom view.
Figure 2:
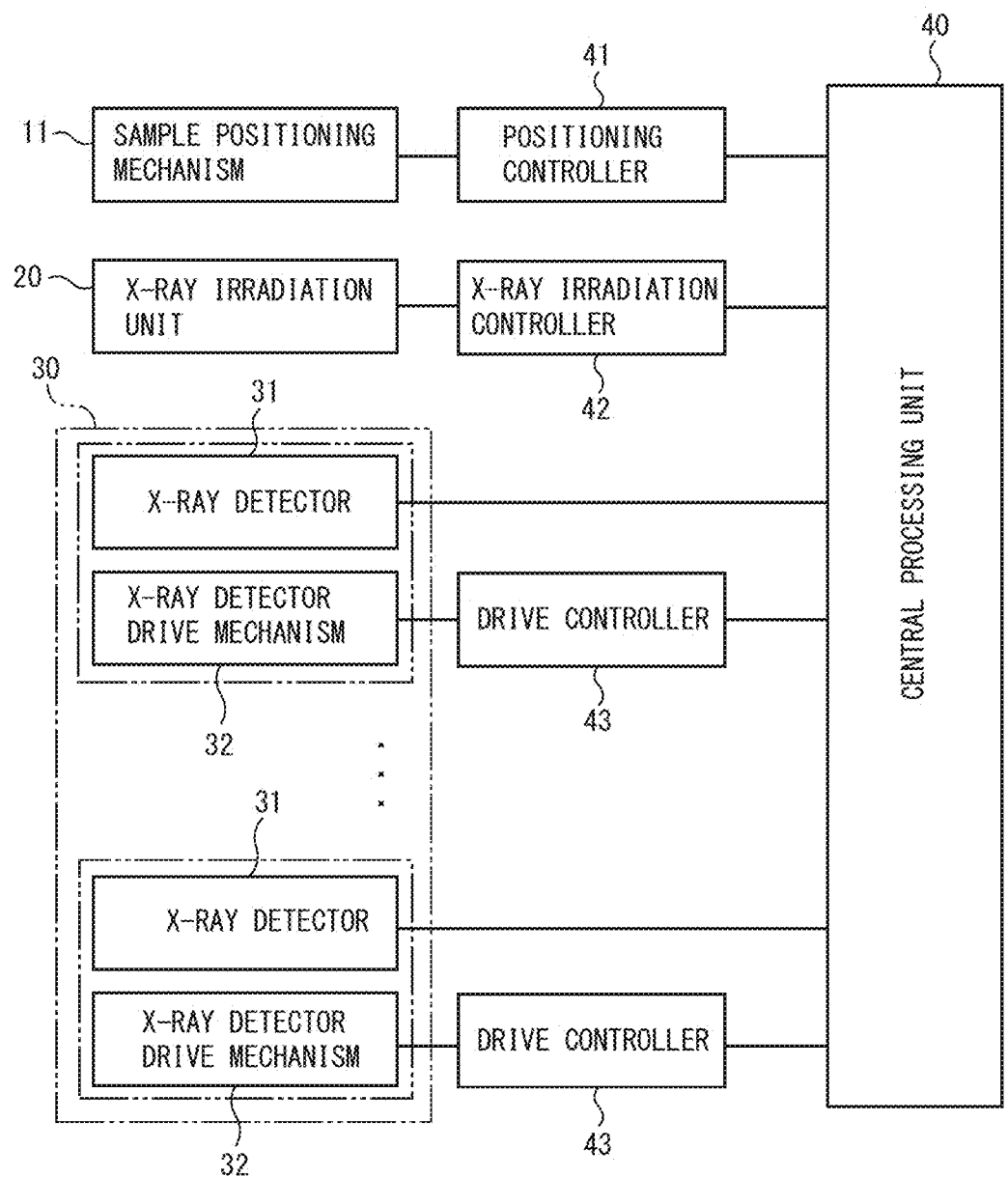
FIG. 2 is a block diagram showing a control/analysis processing system of the fluorescent X-ray analysis apparatus according to the first embodiment of the present invention.

As shown in FIGS. 1A, 1B and 2, the fluorescent X-ray analysis apparatus according to the present embodiment includes components such as a sample stage 10, a sample positioning mechanism 11, an X-ray irradiation unit 20, and an X-ray detection unit 30.

A sample (semiconductor substrate) S is placed on the surface of the sample stage 10.

The sample positioning mechanism 11 is configured to drive the sample stage 10 so that a measurement target portion (that is, an X-ray irradiation site) in the sample S placed on the sample stage 10 is positioned at a focus point of X-rays irradiated from the X-ray irradiation unit 20.

The X-ray irradiation unit 20 has a function of irradiating plural types of X-rays having different energy magnitudes, and the details of the structure will be described later.

The X-ray detection unit 30 includes a plurality of X-ray detectors 31. The respective X-ray detectors 31 are arranged around the measurement target portion of the sample S, and is configured to capture and detect fluorescent X-rays emitted from the sample S.

Further, the X-ray detection unit 30 includes X-ray detector drive mechanisms 32 each of which drives each X-ray detector 31. The X-ray detectors 31 are configured to be individually driven by the X-ray detector drive mechanisms 32 respectively so that the arrangement position thereof can be changed.

As shown in FIGS. 1A and 1B, in the present embodiment, the X-ray detection unit 30 is configured to have an integration structure in which the X-ray irradiation unit 20, the X-ray detectors 31, and the X-ray detector drive mechanisms (not shown) are incorporated in a frame 33. The X-ray irradiation unit 20 is mounted in a center portion of the frame 33, and the plurality of (eight in FIG. 1) X-ray detectors 31 are mounted in the frame 33 so as to surround the X-ray irradiation unit 20. A vacuum chamber 33a is formed inside the frame 33, and the plurality of X-ray detectors 31 are arranged in the vacuum chamber 33a. The inside of the vacuum chamber 33a is evacuated by a vacuum pump (not shown) to be put in a vacuum state.

The X-ray detector drive mechanism 32 can be configured by, for example, a moving table 34 which is driven by a small motor. Specifically, a plurality of moving tables 34 are freely movably mounted in the vacuum chamber 33a of the frame 33, and the X-ray detector 31 is mounted on each of the moving tables 34. Further, the X-ray detection unit 30 may be configured so that a cooling member 35 such as a Peltier cooler is arranged on the bottom surface of the X-ray detector 31 to cool the X-ray detector 31.

As shown in FIG. 2, the fluorescent X-ray analysis apparatus according to the present embodiment includes a central processing unit 40 configured by a computer. The central processing unit 40 sends command signals to various controllers according to a pre-installed control program, and controls the operation of each component. Further, the central processing unit 40 processes X-ray detection signals from the X-ray detectors 31 according to a pre-installed analysis program, and executes fluorescent X-ray analysis of the sample S.

In other words, the central processing unit 40 outputs a command signal to the positioning controller 41, and the positioning controller 41 drives the sample positioning mechanism 11 in accordance with the command signal to move a measurement target portion of the sample S to a focus point of X-rays to be irradiated from the X-ray irradiation unit 20.

Note that in the present embodiment, an observation position based on an optical microscope 50 is set at a position (not shown) which is apart from the apparatus, and the apparatus is configured so that the measurement target portion of the sample S is recognized in advance by the optical microscope 50 at the observation position, and the recognized measurement target portion is moved to the focus point of X-rays from the observation position of the optical microscope 50 by the sample positioning mechanism 11.

Further, the central processing unit 40 outputs a command signal to the X-ray irradiation controller 42, and the X-ray irradiation unit 20 irradiates X-rays according to the command signal. The X-ray irradiation unit 20 has, for example, a function of focusing X-rays on a minute portion of 100 micrometers or less (desirably 50 micrometers or less), and that focus point of the X-rays is positioned in advance. The measurement target portion of the sample S is positioned at the focus point of X-rays.

The plurality of X-ray detector drive mechanisms 32 are driven and controlled by the drive controllers 43, respectively. The central processing unit 40 outputs a command signal to each drive controller 43, and the drive controller 43 drives the X-ray detector drive mechanism 32 to move the X-ray detector 31 according to the command signal.

The central processing unit 40 having such a function constitutes "controller" for moving an X-ray detector 31 that has detected diffracted X-rays diffracted from the sample S among the plurality of X-ray detectors 31 to a position where the diffracted X-rays are not incident.

Here, the configuration of the X-ray irradiation unit 20 will be described in more detail.

The X-ray irradiation unit 20 is configured to include an X-ray source for emitting continuous X-rays, and a multi-wavelength mirror 21. The multi-wavelength mirror 21 has a function of receiving continuous X-rays emitted from the X-ray source and extracting plural types of X-rays having different energy magnitudes.

Figure 3:
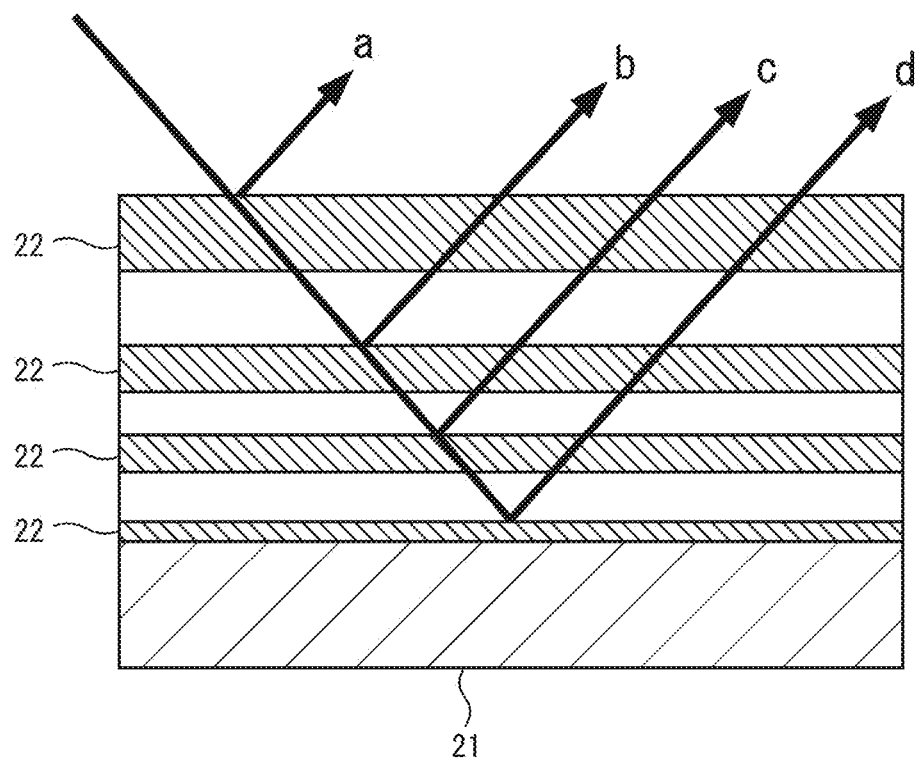
FIG. 3 is a cross-sectional view schematically showing a configuration of a multi-wavelength mirror included in an X-ray irradiation unit.

FIG. 3 is a cross-sectional view schematically showing the configuration of the multi-wavelength mirror 21. A hatching (diagonal lines) indicating the cross-sectional surface is omitted.

The multi-wavelength mirror 21 is formed by laminating plural types of multilayers 22. The multilayer 22 has a configuration in which plural kinds of thin films are laminated. The respective multilayers 22 are produced so that plural types of X-rays having different energy magnitudes can be diffracted by adjusting the film thicknesses, film quality, and number of laminated layers of the thin films in the depth direction.

The multi-wavelength mirror 21 as described above makes it possible to extract plural types of X-rays a, b, c, and d having desired energy magnitudes from continuous X-rays emitted from the X-ray source.

According to the present embodiment, in the multi-wavelength mirror 21, the multilayers 22 are produced by focusing on a measurement target element selected as a measurement target from a plurality of elements contained in the sample S and an adjacent element having a larger energy absorption edge value than that of the measurement target element. In other words, in the multi-wavelength mirror 21, the multilayers 22 are adjusted so as to extract X-rays having energy values which are larger than the energy absorption edge value of the measurement target element and are equal to or less than the energy absorption edge value of the adjacent element.

Further, there is a case where there is no adjacent element having a larger energy absorption edge value among a plurality of measurement target elements selected as measurement targets from a plurality of elements contained in the sample S. At that time, the multilayers 22 are adjusted so as to extract X-rays having an energy value larger than the energy absorption edge value of the measurement target elements.

Here, a specific example of the multi-wavelength mirror 21 in a case where solder bumps formed on a semiconductor substrate are set as a measurement target, Sn and Ag contained in the solder bumps are selected as measurement target elements, and fluorescent X-ray analysis is performed will be described.

As described above, the solder bumps are formed of, for example, lead-free solder having a composition of Sn(0.97) and Ag(0.03). Among the elements constituting these solder bumps, the content of Ag is particularly low, and thus when fluorescent X-ray analysis is performed, it is preferable to adjust the energy characteristics of X-rays to be applied to the solder bumps so that the amount of fluorescent X-rays emitted from Ag increases.

Therefore, one of the multilayers 22 in the multi-wavelength mirror 21 is adjusted so that the multi-wavelength mirror 21 diffracts and extracts X-rays having energy values which are larger than the energy absorption edge value of Ag selected as the measurement target element and are also equal to or less than the energy absorption edge value of Sn as an adjacent element having an energy absorption edge value larger than that of the Ag.

By adjusting one of the multilayers 22 in this way, the excitation efficiency of X-rays is increased even for Ag having a small content among the elements forming the solder bumps, and a large amount of fluorescent X-rays are emitted from Ag.

Further, for the multi-wavelength mirror 21, another one of the multilayers 22 is adjusted so that X-rays having an energy value larger than the energy absorption edge value of Sn selected as the measurement target element are diffracted and extracted.

Figure 4:
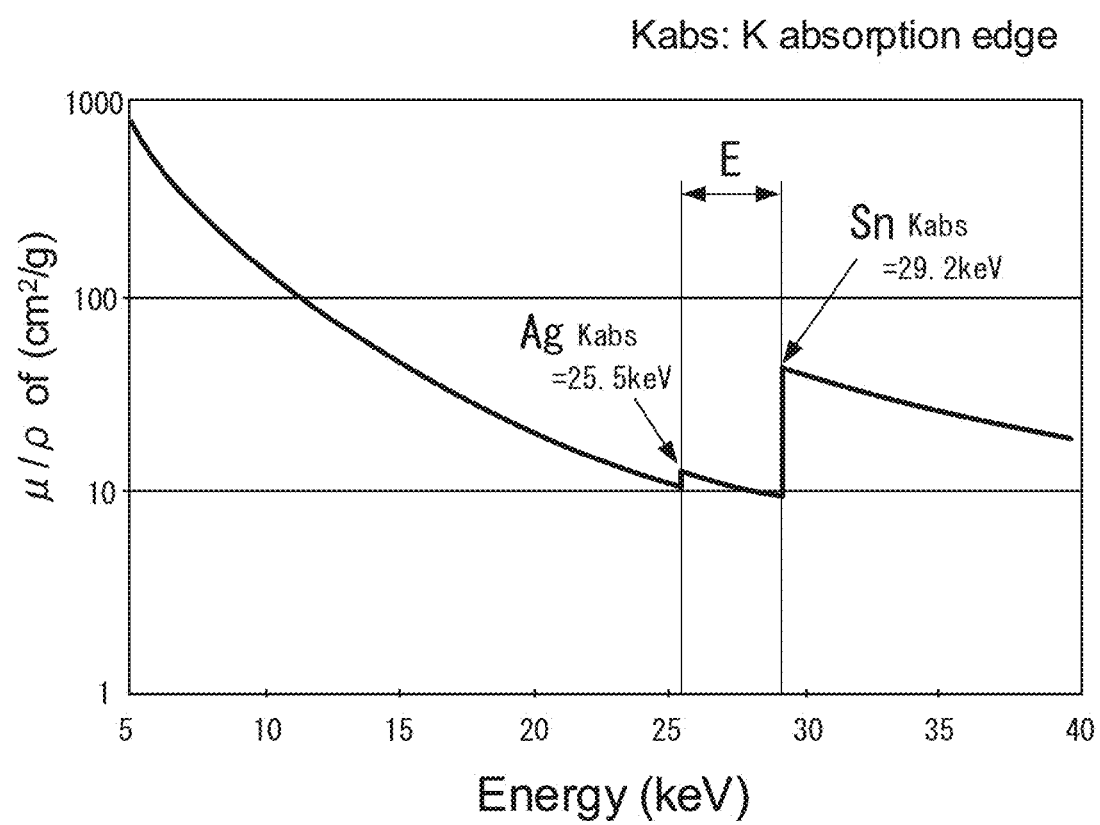
FIG. 4 is a graph showing X-ray absorption edge values of Ag and Sn contained in solder bumps of three-dimensionally mounted semiconductor substrates.

FIG. 4 is a graph showing the X-ray absorption edge values of Ag and Sn contained in the solder bumps.

It is found from the figure that the absorption edge values of X-rays (K) by Sn(0.97) and Ag(0.03) constituting the solder bumps (lead-free solder) are equal to 29.2 keV for Sn and 25.5 keV for Ag.

Therefore, one of the multilayers 22 in the multi-wavelength mirror 21 is adjusted so that the multi-wavelength mirror 21 diffracts and extracts X-rays having energy values (energy values in the range indicated by E in FIG. 4) which are larger than 25.5 keV of the energy absorption edge value of Ag and are equal to or less than 29.2 keV of the energy absorption edge value of Sn as an adjacent element whose energy absorption edge value is larger than that of the Ag.

Further, another one of the multilayers 22 in the multi-wavelength mirror 21 is adjusted so that the multi-wavelength mirror 21 diffracts and extracts X-rays having energy values which are larger than 29.2 keV of the energy absorption edge value of Sn.

Here, it is preferable that the energy of the X-rays to be extracted has energy values which are as close as possible to the energy absorption edge values of the measurement target elements. By irradiating X-rays whose energy magnitudes are in the neighborhood of the energy absorption edge values of elements to be selected, the excitation efficiency of the measurement target elements is further enhanced, and a larger amount of fluorescent X-rays are emitted.

By adjusting the multilayers 22 in this way to produce the multi-wavelength mirror 21, the excitation efficiency of X-rays for Sn and Ag contained in the solder bumps is enhanced, and large amounts of fluorescent X-rays are emitted from these measurement target elements. Therefore, it is possible to perform highly accurate fluorescent X-ray analysis on these measurement target elements.

In the present embodiment, in order to perform fluorescent X-ray analysis on a thin film formed as a measurement target on a semiconductor substrate, in addition to the above-mentioned two types of multilayers 22, another multilayer 22 which is adjusted so as to diffract and extract X-rays having energy values of 8 to 10 keV which enhance the excitation efficiency of the thin film is laminated and formed.

Figure 5:
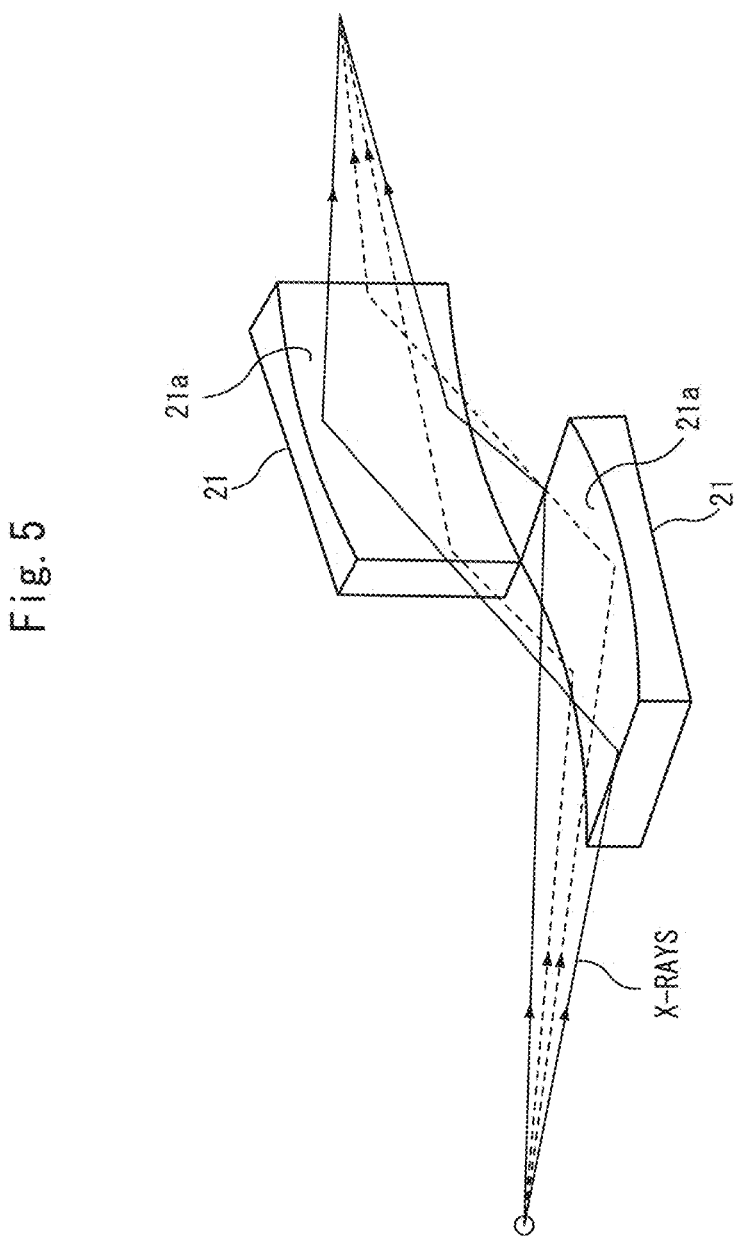
FIG. 5 is a perspective view schematically showing a configuration example of a multi-wavelength mirror for irradiating a minute portion as a measurement target with X-rays while focusing the X-rays.

In the present embodiment, it is necessary to irradiate a minute portion which is a solder bump having a diameter of about 20 to 200 μm as a measurement target while focusing the X-rays on the minute portion. Therefore, for example, as shown in FIG. 5, two multi-wavelength mirrors 21 and 21 each having an X-ray reflecting surface (surface) 21*a* which is curved to have a concave surface are prepared, and the surfaces 21*a* of the multi-wavelength mirrors 21 and 21 are arranged so as to be orthogonal to each other, thereby enabling X-rays to be focused on the minute portion. In other words, one of the multi-wavelength mirrors 21 makes it possible to focus X-rays in the width direction, and the other multi-wavelength mirror 21 makes it possible to focus the X-rays in the length direction.

Note that in FIG. 5, the multi-wavelength mirrors 21 and 21 are arranged in an in-series manner called Kirkpatrick-Baez (KB), but they can also be arranged in a Side-by-side manner in which one sides thereof are in contact with each other.

Next, an operation to be performed when a semiconductor substrate having solder bumps is used as a sample S and fluorescent X-ray analysis is performed by the fluorescent X-ray analysis apparatus having the above-described configuration will be described.

Figure 6:
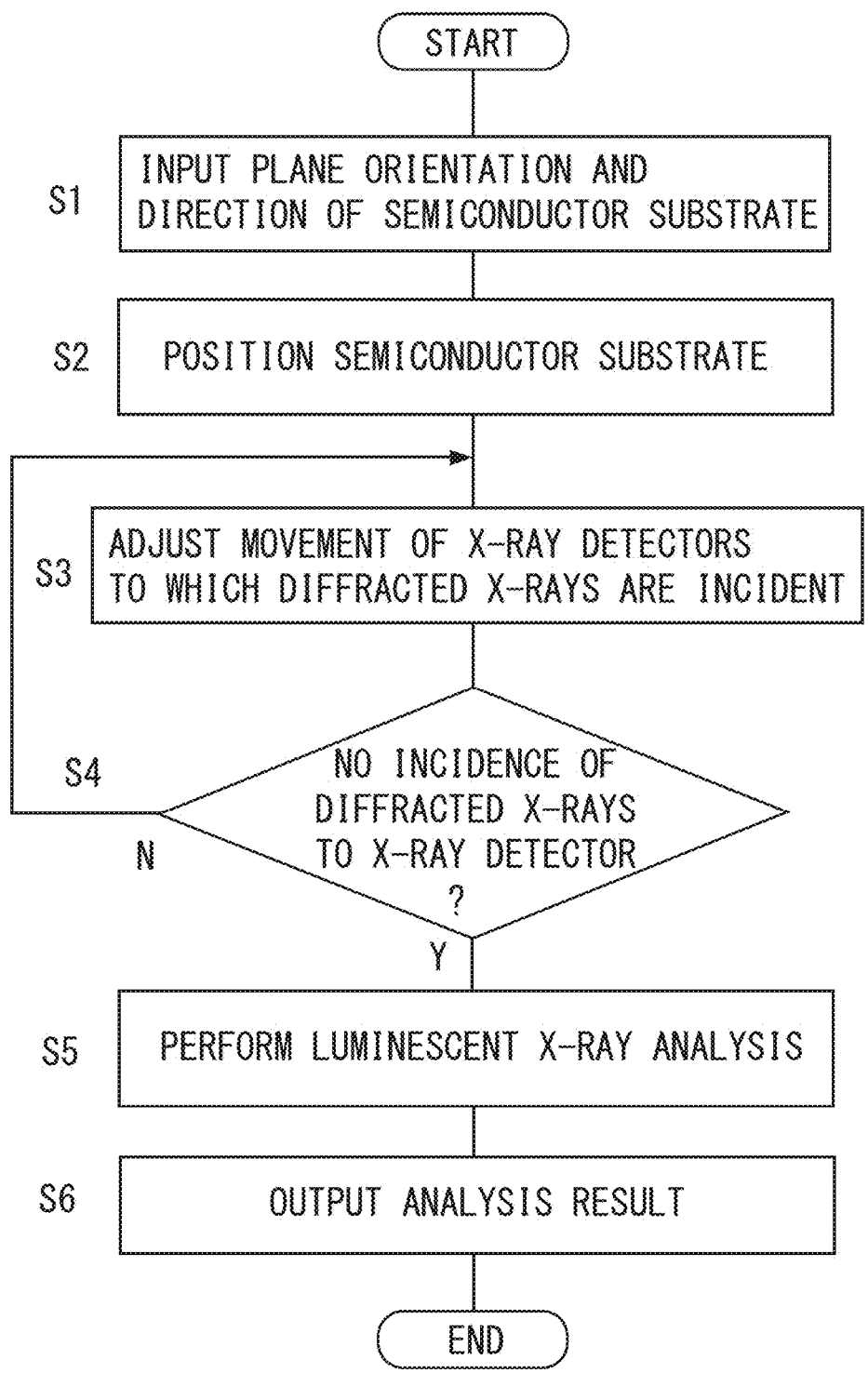
FIG. 6 is a flowchart showing an operation of performing fluorescent X-ray analysis by the fluorescent X-ray analysis apparatus according to the first embodiment of the present invention.

FIG. 6 is a flowchart showing an operation of performing the fluorescent X-ray analysis by the fluorescent X-ray analysis apparatus according to the present embodiment.

When receiving a plane orientation and an arrangement direction of a semiconductor substrate for incident X-rays which are indicated through an operation unit such as a keyboard by an operator (step S1), the central processing unit 40 outputs a command signal to the positioning controller 41, and the positioning controller 41 drives the sample positioning mechanism 11 to position a measurement target portion (solder bump) of the semiconductor substrate placed on the sample stage 10 at the focus point of X-rays to be irradiated from the X-ray irradiation unit 20 (step S2).

At this time, the semiconductor substrate is placed on the sample stage 10 so that the plane orientation (crystal orientation) of the crystal forming the semiconductor substrate is set to a preset direction with reference to an orientation flat or the like. The central processing unit 40 positions the measurement target portion of the semiconductor substrate at the focus point of X-rays to be irradiated in a state where the semiconductor substrate whose plane orientation of the crystal has been arranged in a preset direction on the sample stage 10 is matched with a plane orientation and an arrangement direction indicated by the operator.

For the semiconductor substrate which has been positioned so that the plane orientation of the crystal is aligned with the indicated direction, an approximate direction in which diffracted X-rays appear with respect to the irradiation direction of X-rays can be known. Therefore, the X-ray detectors 31 arranged in the direction in which the diffracted X-rays appear are moved to positions where the diffracted X-rays are not incident (step S3). As a result, the incidence of the diffracted X-rays appearing from the semiconductor substrate to the X-ray detectors 31 can be reduced in advance.

Specifically, the central processing unit 40 outputs a command signal to the drive controller 43 of the X-ray detector drive mechanisms 32 that move the X-ray detectors 31. According to this command signal, the drive controllers 43 drive the X-ray detector drive mechanisms 32 to move the X-ray detectors 31 to the positions where the diffracted X-rays are not incident.

Here, the central processing unit 40 compares the X-ray detection signals (X-ray spectra) input from the respective X-ray detectors 31 to check the presence or absence of an X-ray detector 31 which outputs a detection signal indicating an abnormal value due to incidence of diffracted X-rays thereto (step S4).

When the presence of an X-ray detector 31 outputting a detection signal indicating an abnormal value due to incidence of diffracted X-rays thereto is recognized, the central processing unit 40 returns to step S3 to output a command signal to the drive controller 43 of the X-ray detector drive mechanism 32 for moving the X-ray detector 31 concerned to move and adjust the position of the X-ray detector 31 so that diffracted X-rays are not incident to the X-ray detector 31.

In step S4, when the presence of an X-ray detector 31 outputting a detection signal indicating an abnormal value due to incidence of diffracted X-rays thereto is not recognized, a solder bump provided at a measurement target portion of the semiconductor substrate is irradiated with X-rays, and fluorescent X-ray analysis is performed (step S5).

In other words, the central processing unit 40 outputs a command signal to the X-ray irradiation controller 42, and the X-ray irradiation unit 20 irradiates the measurement target portion of the semiconductor substrate with X-rays according to this command signal. Then, each X-ray detector 31 detects fluorescent X-rays emitted from the measurement target portion (solder bump) of the semiconductor substrate, and the central processing unit 40 receives this detection signal to perform fluorescent X-ray analysis.

Thereafter, an analysis result of the fluorescent X-ray analysis is output (step S6), and the measurement operation is completed.

As described above, the fluorescent X-ray analysis can be performed after a situation in which diffracted X-rays diffracted from the semiconductor substrate (sample) S are avoided from being incident as noise to the X-ray detectors 31 is established, so that S/N is enhanced and a highly accurate analysis result can be obtained.

Second Embodiment

Next, a fluorescent X-ray analysis apparatus according to a second embodiment of the present invention will be described with reference to FIGS. 7A to 9.

Note that the same components as or corresponding component elements to those of the fluorescent X-ray analysis apparatus according to the first embodiment described above are designated by the same reference signs, and detailed description thereof may be omitted.

Figure 7A:
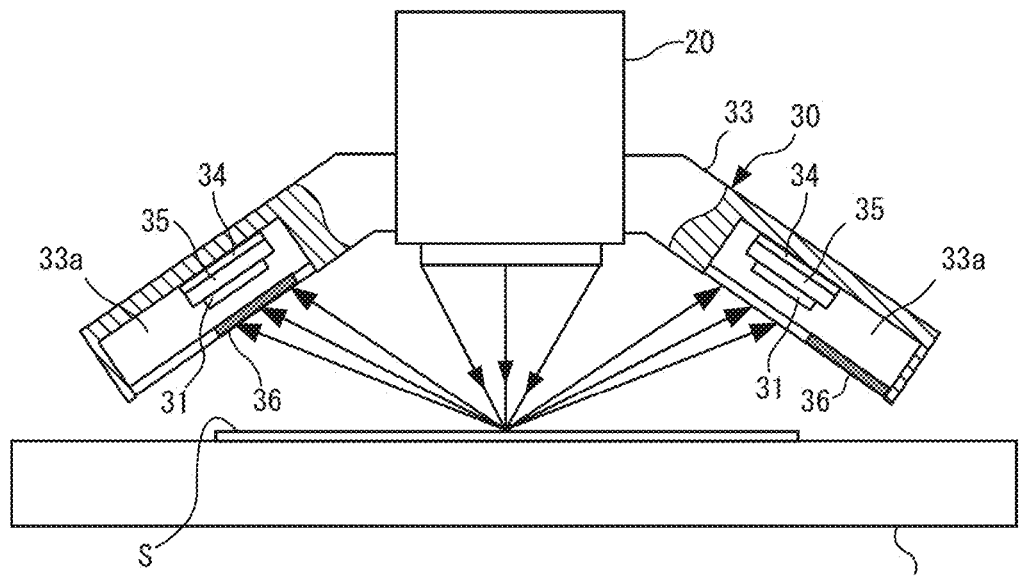
FIG. 7A is a partial cross-sectional front view schematically showing a main part of a fluorescent X-ray analysis apparatus according to a second embodiment of the present invention.
Figure 7B:
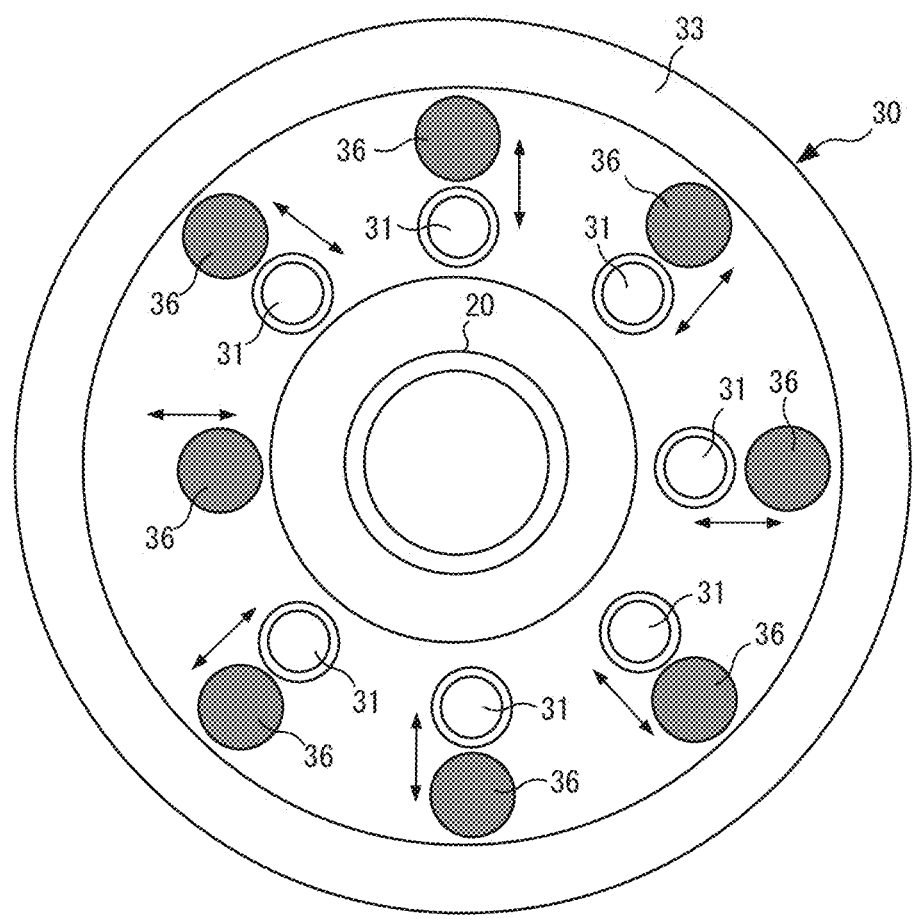
FIG. 7B is also a bottom view.

The fluorescent X-ray analysis apparatus according to the present embodiment is configured so that in place of the X-ray detector drive mechanisms 32 for driving the respective X-ray detectors 31, X-ray shielding doors 36 for shielding X-rays are provided in front of the respective X-ray detectors 31 so as to be openable and closable in the device structure according to the first embodiment shown in FIGS. 1A and 1B (see FIGS. 7A and 7B). The X-ray shielding door 36 is preferably made of a material that does not easily transmit X-rays, such as lead or tungsten. By closing the X-ray shielding door 36, X-rays that are about to be incident to each X-ray detector 31 can be blocked.

The X-ray shielding door 36 may be configured to be opened and closed by, for example, a drive mechanism such as a small motor.

Figure 8:
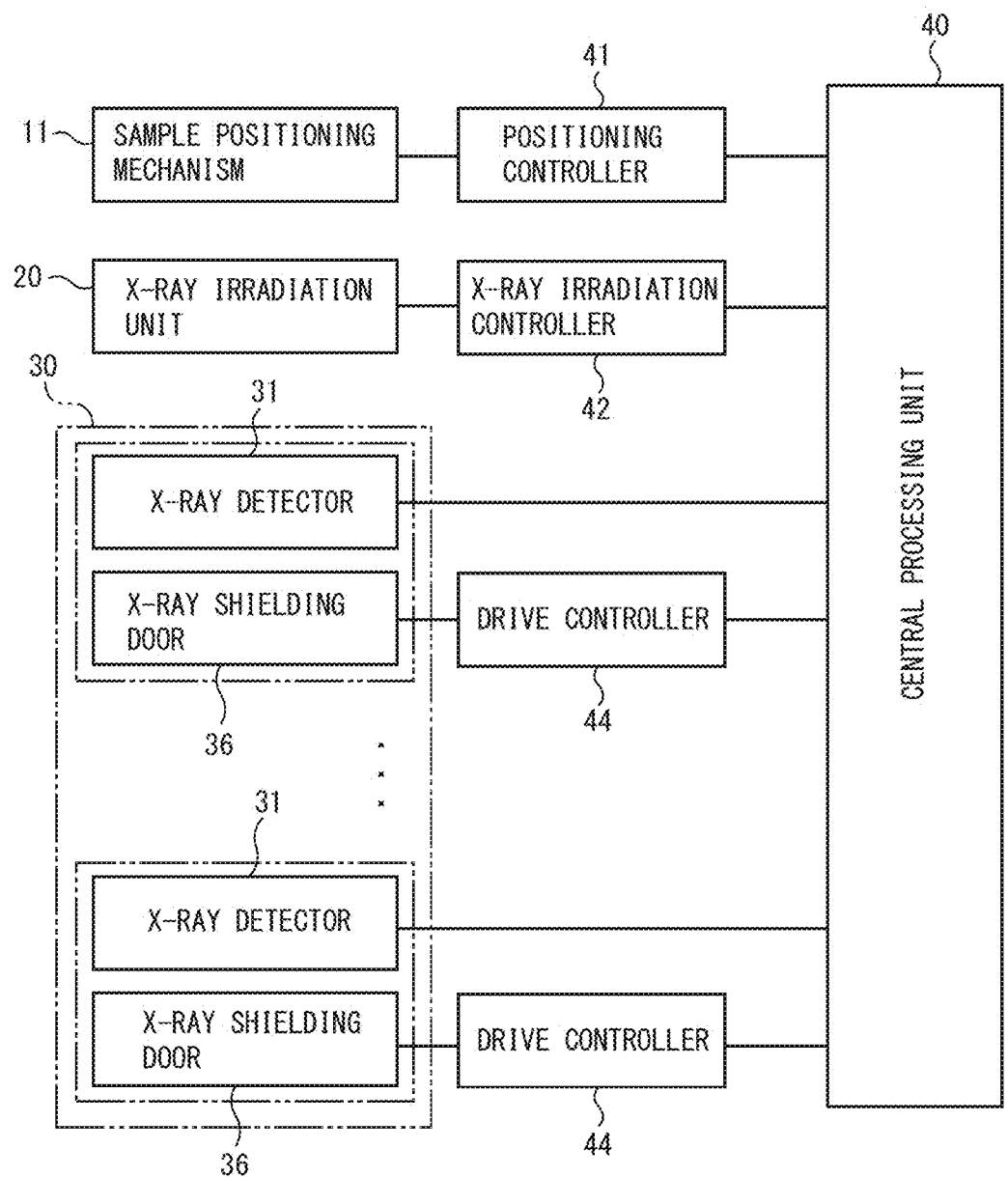
FIG. 8 is a block diagram showing a control/analysis processing system of the fluorescent X-ray analysis apparatus according to the second embodiment of the present invention.

As shown in FIG. 8, drive mechanisms of the plurality of X-ray shielding doors 36 are driven and controlled by respective drive controllers 44. The central processing unit 40 outputs a command signal to each drive controller 44, and the drive controller 44 drives the drive mechanism of the X-ray shielding door 36 to open and close the X-ray shielding door 36 according to the command signal.

The central processing unit 40 having such a function constitutes a "controller" for closing X-ray shielding doors 36 for X-ray detectors 31 that have detected diffracted X-rays diffracted from the sample among the plurality of X-ray detectors 31.

Figure 9:
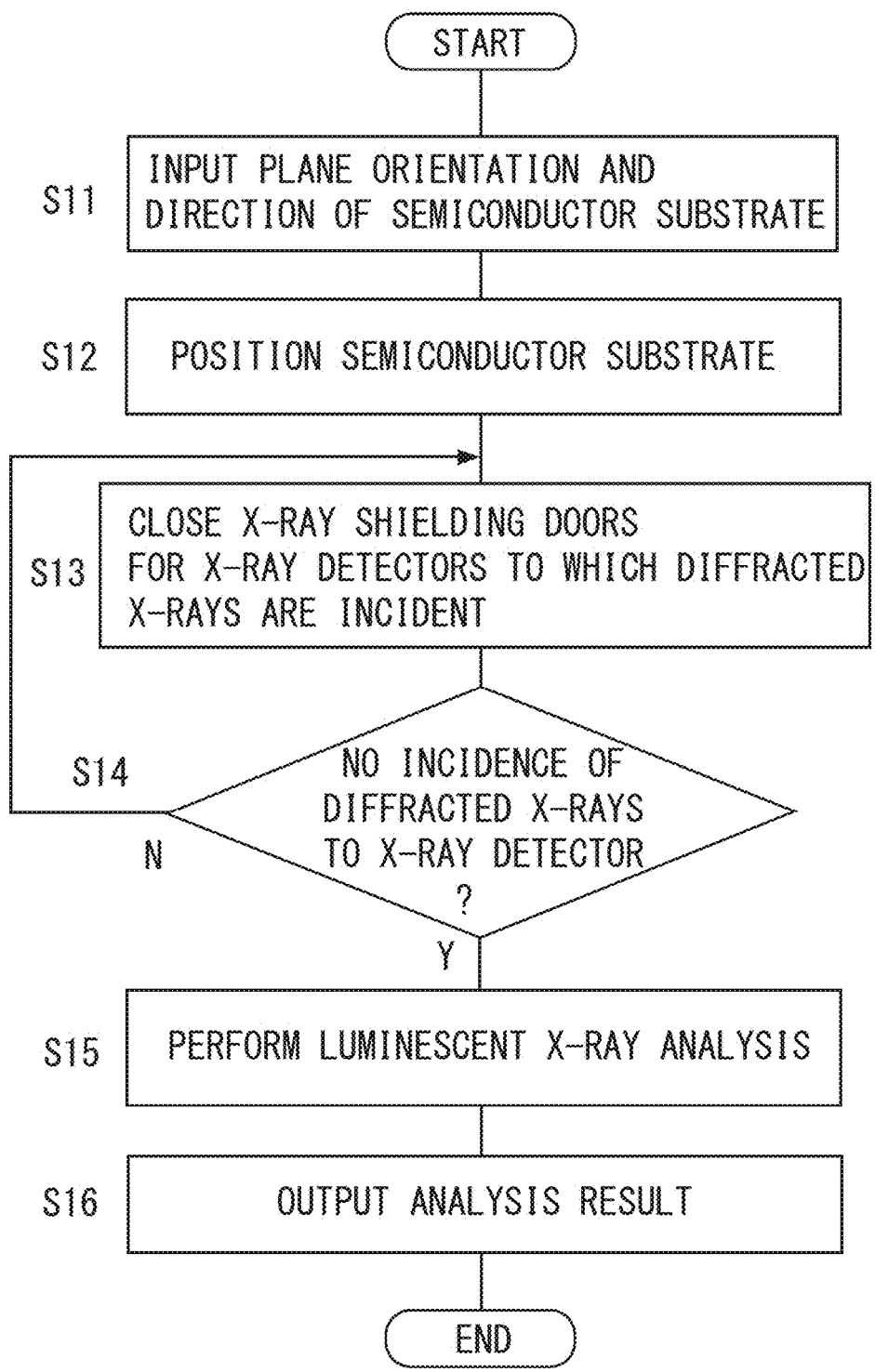
FIG. 9 is a flowchart showing an operation of performing fluorescent X-ray analysis by the fluorescent X-ray analysis apparatus according to the second embodiment of the present invention.

FIG. 9 is a flowchart showing an operation of performing fluorescent X-ray analysis by the fluorescent X-ray analysis apparatus according to the present embodiment.

When receiving a plane orientation and an arrangement direction of a semiconductor substrate for incident X-rays which are indicated through an operation unit such as a keyboard by an operator (step S11), the central processing unit 40 outputs a command signal to the positioning controller 41, and the positioning controller 41 drives the sample positioning mechanism 11 to position a measurement target portion (solder bump) of the semiconductor substrate placed on the sample stage 10 at the focus point of X-rays to be irradiated from the X-ray irradiation unit 20 (step S12).

At this time, the semiconductor substrate is placed on the sample stage 10 so that the plane orientation (crystal orientation) of the crystal forming the semiconductor substrate is set to a preset direction with reference to an orientation flat or the like. The central processing unit 40 positions the measurement target portion of the semiconductor substrate at the focus point of X-rays to be irradiated in a state where the semiconductor substrate whose plane orientation of the crystal has been arranged in a preset direction on the sample stage 10 is matched with a plane orientation and an arrangement direction indicated by the operator.

For the semiconductor substrate which has been positioned so that the plane orientation of the crystal is aligned with the indicated direction, an approximate direction in which diffracted X-rays appear with respect to the irradiation direction of X-rays can be known. Therefore, the X-ray shielding doors 36 are closed for the X-ray detectors 31 arranged in a direction in which diffracted X-rays appear (step S13). As a result, incidence of the diffracted X-rays appearing from the semiconductor substrate to the X-ray detectors 31 can be reduced in advance.

Specifically, the central processing unit 40 outputs a command signal to the drive controllers 44 of the drive mechanisms that close the X-ray shielding doors 36. According to this command signal, the drive controllers 44 drive the drive mechanisms to close the X-ray shielding doors 36.

Here, the central processing unit 40 compares the X-ray detection signals (X-ray spectra) input from the respective X-ray detectors 31 and checks the presence or absence of an X-ray detector 31 which outputs a detection signal indicating an abnormal value due to incidence of diffracted X-rays thereto (step S14).

When the presence of an X-ray detector 31 outputting a detection signal indicating an abnormal value due to incidence of diffracted X-rays thereto is recognized, the central processing unit 40 returns to step S13 and outputs a command signal to the drive controller 44 of the drive mechanism for closing the X-ray shielding door 36 for the X-ray detector 31 concerned so that the X-ray shielding door 36 is closed so that diffracted X-rays are not incident to the X-ray detector 31.

In step S14, when the presence of an X-ray detector 31 which outputs a detection signal indicating an abnormal value due to incidence of diffracted X-rays thereto is not recognized, a solder bump provided at a measurement target portion of the semiconductor substrate is irradiated with X-rays, and fluorescent X-ray analysis is performed (step S15). Thereafter, an analysis result of the fluorescent X-ray analysis is output (step S16), and the measurement operation is completed.

As described above, the fluorescent X-ray analysis can be performed after a situation in which diffracted X-rays diffracted from the semiconductor substrate (sample) S are avoided from being incident as noise to the X-ray detectors 31 is established, so that S/N is enhanced and a highly accurate analysis result can be obtained.

Third Embodiment

Next, a fluorescent X-ray analysis apparatus according to a third embodiment of the present invention will be described with reference to FIGS. 10 and 11.

Note that the same components as or corresponding component elements to those of the fluorescent X-ray analysis apparatuses according to the first and second embodiments described above are designated by the same reference signs, and detailed description thereof may be omitted.

Figure 10:
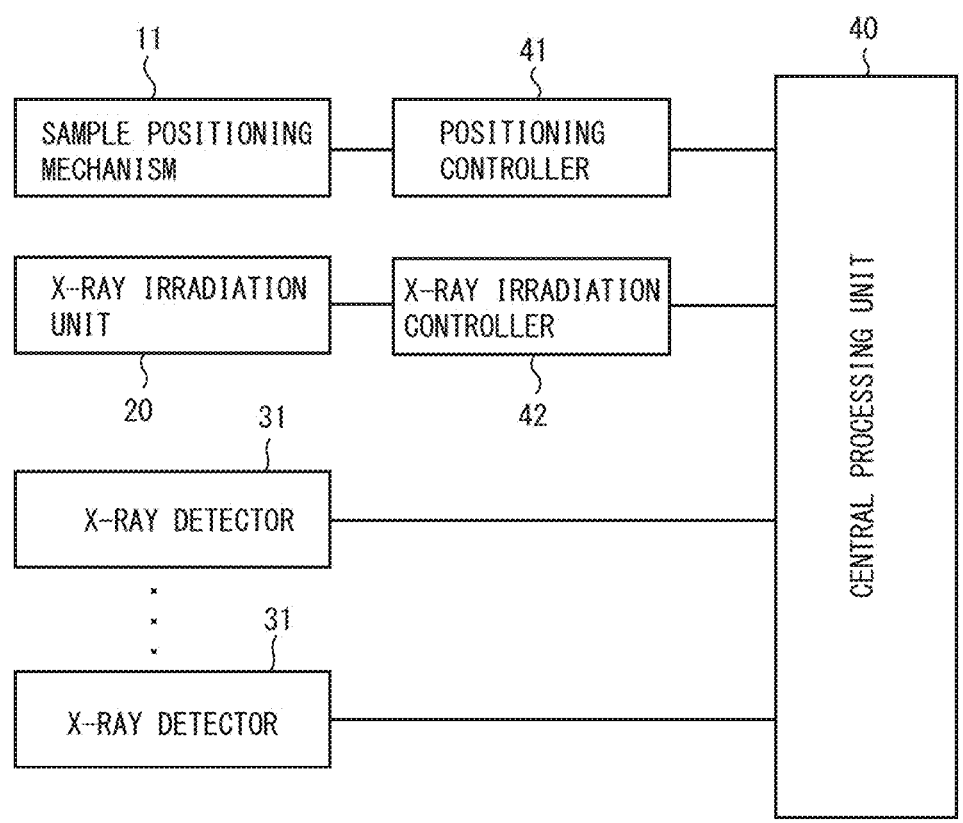
FIG. 10 is a block diagram showing a control/analysis processing system of a fluorescent X-ray analysis apparatus according to a third embodiment of the present invention.

The fluorescent X-ray analysis apparatus according to the present embodiment is configured so that the X-ray detector drive mechanisms 32 for moving the respective X-ray detectors 31 and the drive controllers 43 are removed in the device structure according to the first embodiment shown in FIG. 1 (see FIG. 10).

The central processing unit 40 compares the X-ray detection signals (X-ray spectra) input from the respective X-ray detectors 31, and checks the presence or absence of any X-ray detector 31 that outputs a detection signal indicating an abnormal value due to incidence of diffracted X-rays thereto. The central processing unit 40 excludes a detection signal from an X-ray detector 31 having detected diffracted X-rays among the plurality of X-ray detectors 31.

In other words, in the present embodiment, the central processing unit 40 constitutes an "analysis unit" for excluding detection signals from X-ray detectors 31 having detected diffracted X-rays, and for performing fluorescent X-ray analysis based on detection signals input from the other X-ray detectors 31.

Figure 11:
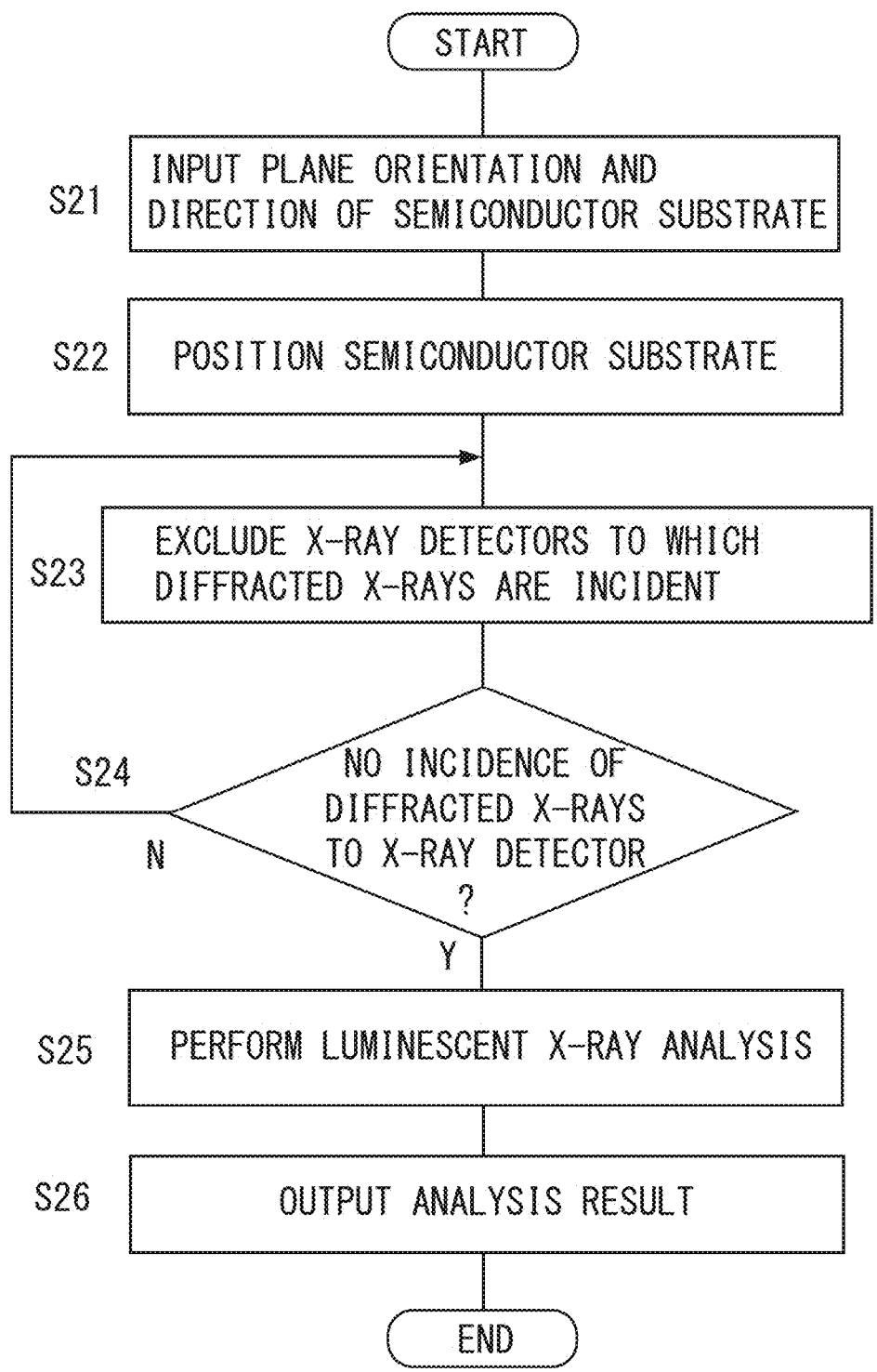
FIG. 11 is a flowchart showing an operation of performing fluorescent X-ray analysis by the fluorescent X-ray analysis apparatus according to the third embodiment of the present invention.

FIG. 11 is a flowchart showing an operation of performing fluorescent X-ray analysis by the fluorescent X-ray analysis apparatus according to the present embodiment.

When receiving a plane orientation and an arrangement direction of a semiconductor substrate for incident X-rays which are indicated through an operation unit such as a keyboard by an operator (step S21), the central processing unit 40 outputs a command signal to the positioning controller 41, and the positioning controller 41 drives the sample positioning mechanism 11 to position a measurement target portion (solder bump) of the semiconductor substrate placed on the sample stage 10 at the focus point of X-rays to be irradiated from the X-ray irradiation unit 20 (step S22).

Subsequently, the central processing unit 40 outputs a command signal to the X-ray irradiation controller 42, and the X-ray irradiation unit 20 irradiates a measurement target portion of the semiconductor substrate with X-rays according to this command signal. The central processing unit 40 receives detection signals from the respective X-ray detectors 31, compares the input X-ray detection signals (X-ray spectra) and excludes detection signals from X-ray detectors 31 indicating abnormal values due to incidence of diffracted X-rays thereto (step S23).

After the presence of any X-ray detector 31 which outputs a detection signal indicating an abnormal value due to incidence of diffracted X-rays thereto is no longer recognized through such exclusion processing (step S24), the central processing unit 40 performs fluorescent X-ray analysis (step S25).

In other words, the central processing unit 40 outputs a command signal to the X-ray irradiation controller 42, and the X-ray irradiation unit 20 irradiates the measurement target portion of the semiconductor substrate with X-rays according to this command signal. The respective X-ray detectors 31 detect fluorescent X-rays emitted from the measurement target portion (solder bump) of the semiconductor substrate, and the central processing unit 40 receives these detection signals and performs the fluorescent X-ray analysis.

Thereafter, the central processing unit 40 outputs an analysis result of the fluorescent X-ray analysis (step S26), and the measurement operation is completed.

As described above, the fluorescent X-ray analysis can be performed after a situation in which diffracted X-rays diffracted from the semiconductor substrate (sample) S are avoided from being incident as noise to the X-ray detectors 31 is established, so that S/N is enhanced and a highly accurate analysis result can be obtained.

Fourth Embodiment

Next, a fluorescent X-ray analysis apparatus according to a fourth embodiment of the present invention will be described with reference to FIGS. 12A to 14.

Note that the same components as or corresponding component elements to those of the fluorescent X-ray analysis apparatuses according to the first to third embodiments described above are designated by the same reference signs, and detailed description thereof may be omitted.

Figure 12A:
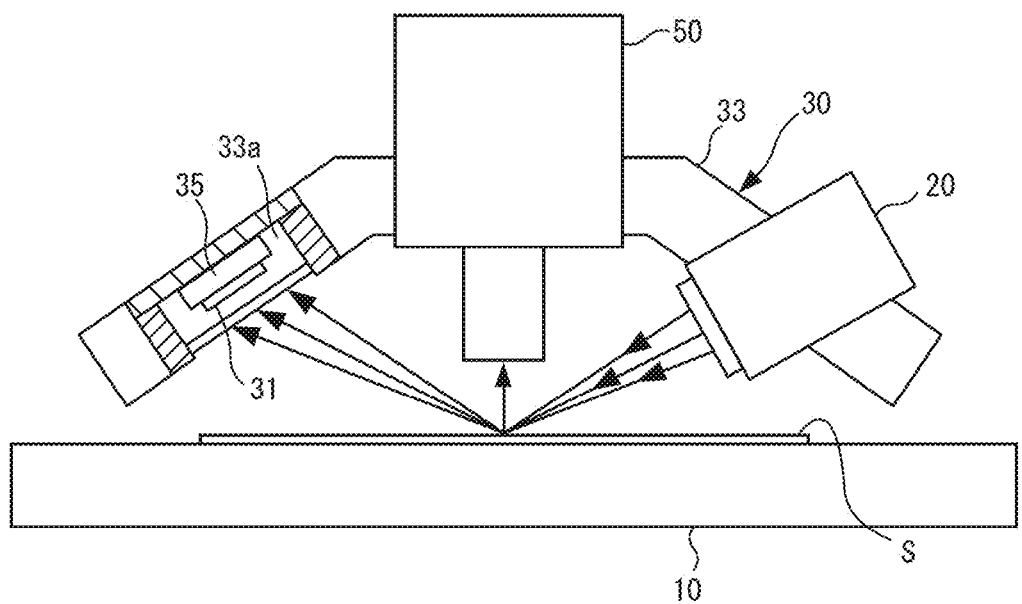
FIG. 12A is a partial cross-sectional front view schematically showing a main part of a fluorescent X-ray analysis apparatus according to a fourth embodiment of the present invention.
Figure 12B:
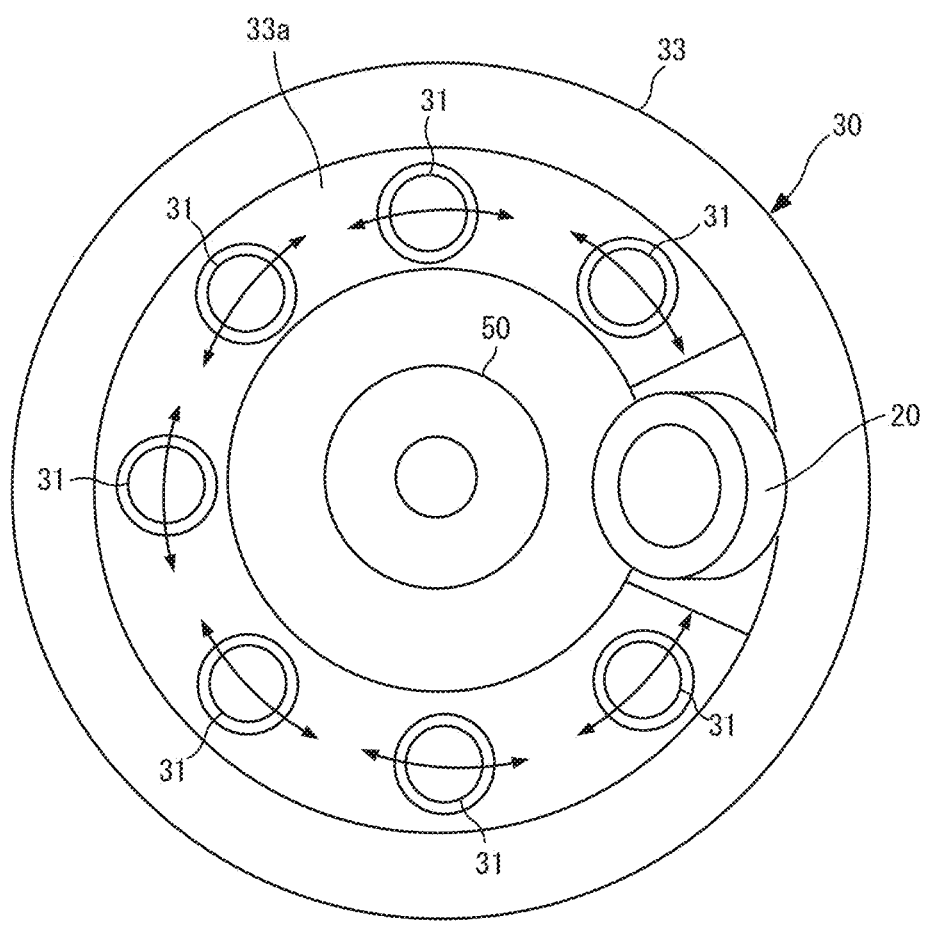
FIG. 12B is also a bottom view.

As shown in FIGS. 12A and 12B, the fluorescent X-ray analysis apparatus according to the present embodiment is configured so that an optical microscope 50 is mounted at the center portion of the frame 33, and the X-ray irradiation unit 20 is mounted at a side position of the optical microscope 50 in the frame 33. A plurality of X-ray detectors 31 (seven in FIG. 12B) are installed in the frame 33 and arranged around the optical microscope 50 so as to surround the optical microscope 50.

The focus point of X-rays to be irradiated by the X-ray irradiation unit 20 is positioned at a position below the optical microscope 50, that is, a position where it is possible to observe through the optical microscope 50.

Figure 13:
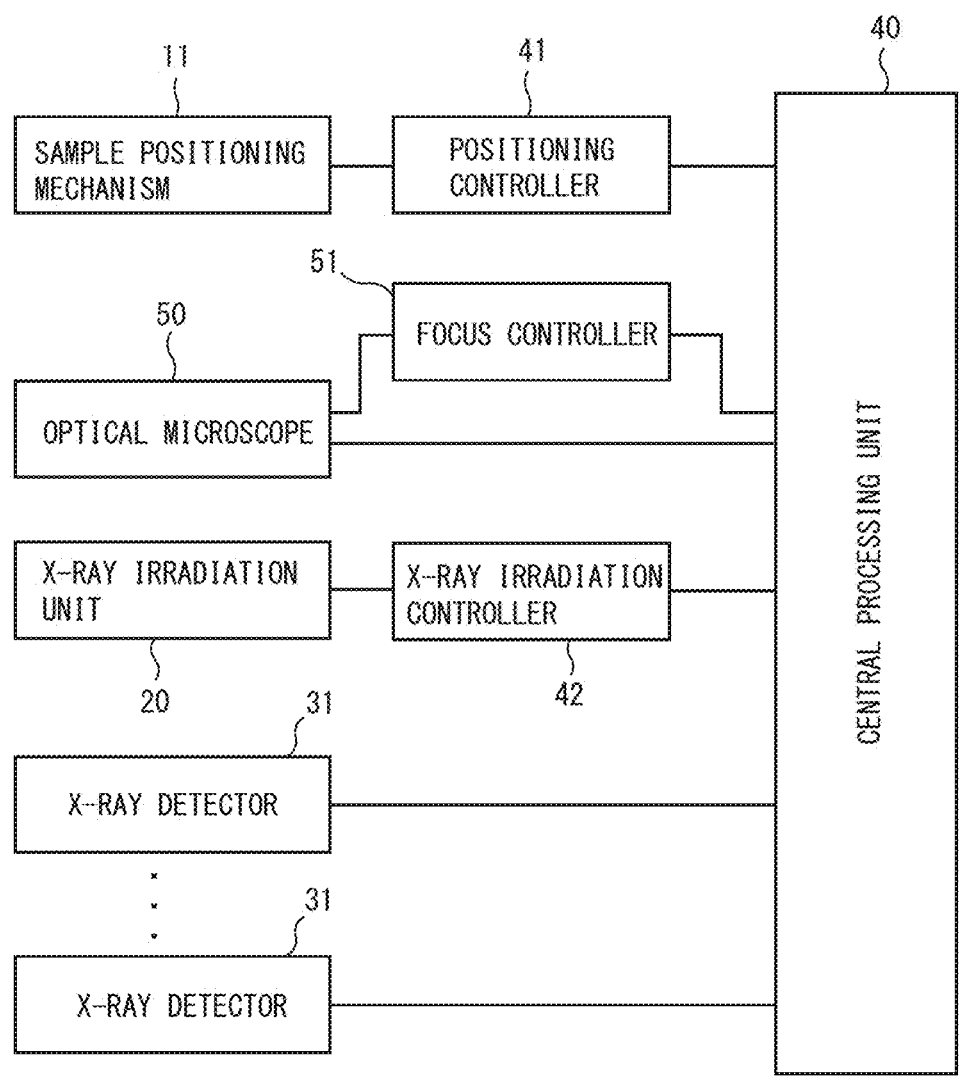
FIG. 13 is a block diagram showing a control/analysis processing system of the fluorescent X-ray analysis apparatus according to the fourth embodiment of the present invention.

As shown in FIG. 13, the central processing unit 40 outputs a command signal to a focus controller 51, and according to this command signal, the focus controller 51 sets the focal point of the optical microscope 50 to the focus point of irradiated X-rays which is set below the optical microscope 50. Then, the focus point of the irradiated X-rays is image-recognized from an image signal sent from the optical microscope 50, whereby the focus point is observed in real time.

Actually, as described later, the optical microscope 50 is focused on the measurement target portion (solder bump) of the sample (semiconductor substrate) S which has been roughly positioned at the focus point of irradiated X-rays to observe the measurement target portion.

The central processing unit 40 outputs a command signal to the positioning controller 41 to drive the sample positioning mechanism 11 while observing the focus point of the irradiated X-rays through the optical microscope 50, whereby the measurement target portion of the sample S is positioned at the focus point of the irradiated X-rays with high accuracy.

Figure 14:
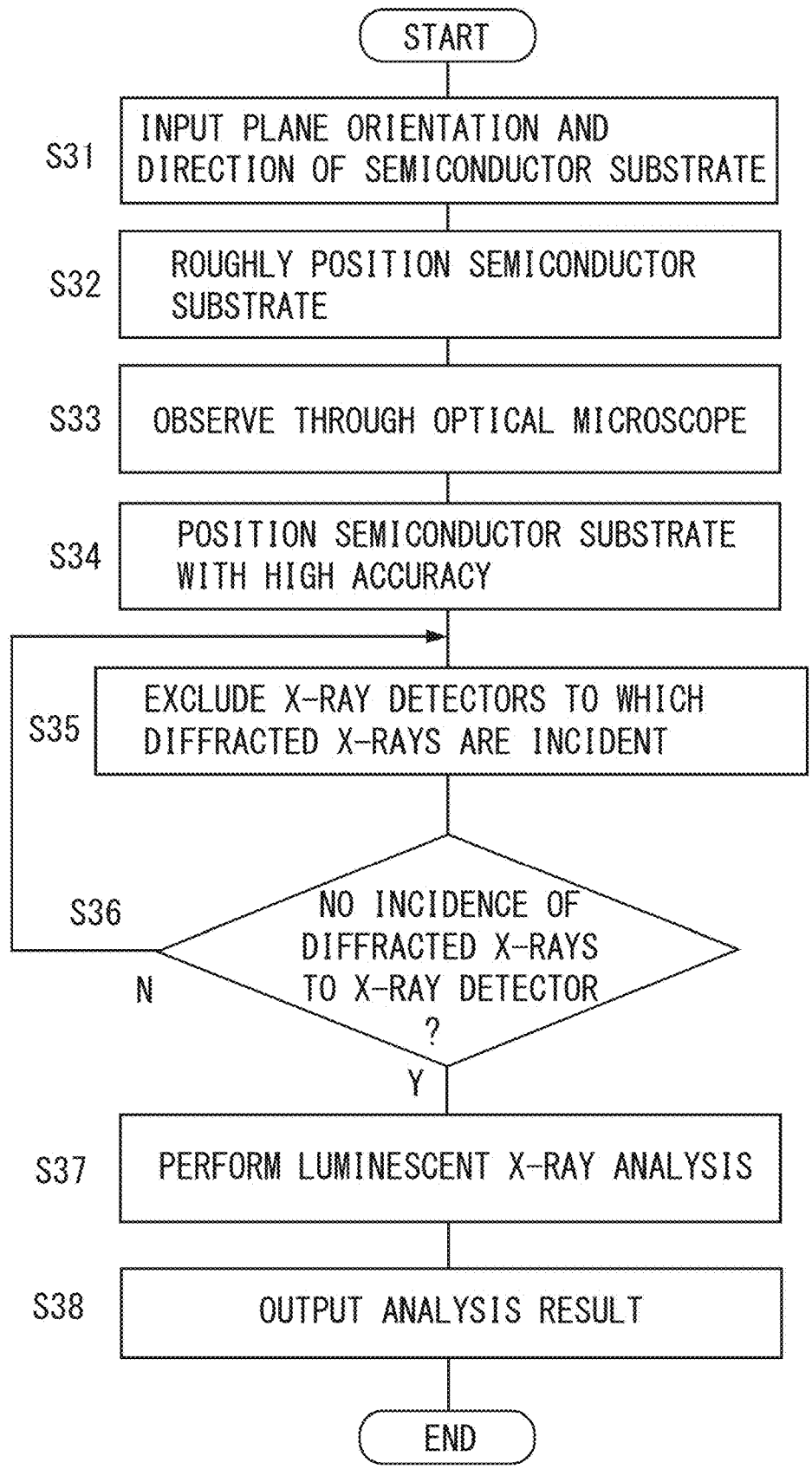
FIG. 14 is a flowchart showing an operation of performing fluorescent X-ray analysis by the fluorescent X-ray analysis apparatus according to the fourth embodiment of the present invention.

FIG. 14 is a flowchart showing an operation of performing fluorescent X-ray analysis by the fluorescent X-ray analysis apparatus according to the present embodiment.

When receiving a plane orientation and an arrangement direction of a semiconductor substrate for incident X-rays which are indicated through an operation unit such as a keyboard by an operator (step S31), the central processing unit 40 outputs a command signal to the positioning controller 41, and the positioning controller 41 drives the sample positioning mechanism 11 to roughly position a measurement target portion (solder bump) of the semiconductor substrate placed on the sample stage 10 at the focus point of X-rays to be irradiated from the X-ray irradiation unit 20 (step S32).

Subsequently, the central processing unit 40 outputs a command signal to the focus controller 51 to set the focal point of the optical microscope 50 to the measurement target portion of the semiconductor substrate, and the central processing unit receives an image signal from the optical microscope 50 to observe the measurement target portion (step S33).

The central processing unit outputs a command signal to the positioning controller 41 while observing the measurement target portion based on the image signal from the optical microscope 50. The positioning controller 41 drives the sample positioning mechanism 11 according to this command signal so that the measurement target portion (solder bump) of the semiconductor substrate placed on the sample stage 10 is positioned at the focus point of X-rays to be irradiated from the X-ray irradiation unit 20 with high accuracy (step S34).

Subsequently, the central processing unit 40 outputs a command signal to the X-ray irradiation controller 42, and the X-ray irradiation unit 20 irradiates the measurement target portion of the semiconductor substrate with X-rays according to this command signal. The central processing unit 40 receives detection signals from the respective X-ray detectors 31, compares the input X-ray detection signals (X-ray spectra) and excludes detection signals from X-ray detectors 31 indicating abnormal values due to incidence of diffracted X-rays thereto (step S35).

After the presence of any X-ray detector 31 which outputs a detection signal indicating an abnormal value due to incidence of diffracted X-rays thereto is no longer recognized through such exclusion processing (step S36), the central processing unit 40 performs fluorescent X-ray analysis (step S37).

In other words, the central processing unit 40 outputs a command signal to the X-ray irradiation controller 42, and the X-ray irradiation unit 20 irradiates the measurement target portion of the semiconductor substrate with X-rays according to the command signal. The respective X-ray detectors 31 detect fluorescent X-rays emitted from the measurement target portion (solder bump) of the semiconductor substrate, and the central processing unit 40 receives the detection signals, and performs the fluorescent X-ray analysis.

Thereafter, the central processing unit 40 outputs an analysis result of the fluorescent X-ray analysis (step S38), and the measurement operation is completed.

As described above, the fluorescent X-ray analysis can be performed after a situation in which diffracted X-rays diffracted from the semiconductor substrate (sample) S are avoided from being incident as noise to the X-ray detectors 31 is established, so that S/N is enhanced and a highly accurate analysis result can be obtained.

Moreover, according to the configuration of the present embodiment, the measurement target portion of the semiconductor substrate can be positioned with high accuracy at the focus point of irradiated X-rays while observing the measurement target portion of the semiconductor substrate in real time by using the optical microscope 50.

Note that the present invention is not limited to the above-described embodiments, and it goes without saying that various modifications and applications can be implemented.

For example, the X-ray irradiation unit 20 may be configured so that a sample can be irradiated with plural types of X-rays having different energy magnitudes by using an optical device other than a multi-wavelength mirror.

The invention claimed is:

1. A fluorescent X-ray analysis apparatus comprising:
an X-ray irradiation unit for irradiating a sample containing a plurality of elements with X-rays;
an X-ray detection unit for detecting fluorescent X-rays emitted from the sample; and
a controller,
wherein the X-ray irradiation unit comprises an X-ray source for emitting continuous X-rays, and a multi-wavelength mirror to which the continuous X-rays emitted from the X-ray source are incident,
wherein the X-ray irradiation unit is configured to focus on a specific measurement target element selected as a measurement target from the plurality of elements contained in the sample and an adjacent element, from the plurality of elements contained in the sample, having an energy absorption edge value larger than an energy absorption edge value of the specific measurement target element, and irradiate the sample with X-rays having energy values, which are larger than the energy absorption edge value of the specific measurement target element and are equal to or less than the energy absorption edge value of the adjacent element,
wherein with respect to a measurement target element for which there is no adjacent element having a larger energy absorption edge value among a plurality of other measurement target elements selected as measurement targets from the plurality of elements contained in the sample, the X-ray irradiation unit is configured so that the sample is also irradiated with X-rays having an energy value larger than an energy absorption edge value of the measurement target element,
wherein the X-ray detection unit comprises a plurality of X-ray detectors, and the plurality of X-ray detectors are arranged around an X-ray irradiation site of the sample to be irradiated with X-rays from the X-ray irradiation unit in such a posture as to take the fluorescent X-rays emitted from the sample, the plurality of X-ray detectors are freely movable independently of one another, and
wherein the controller is configured to move X-ray detectors among the plurality of X-ray detectors having detected X-rays diffracted from the sample to positions where the diffracted X-rays are not incident thereto.

2. A fluorescent X-ray analysis apparatus comprising:
an X-ray irradiation unit for irradiating a sample containing a plurality of elements with X-rays;
an X-ray detection unit for detecting fluorescent X-rays emitted from the sample; and
a controller,
wherein the X-ray irradiation unit comprises an X-ray source for emitting continuous X-rays, and a multi-wavelength mirror to which the continuous X-rays emitted from the X-ray source are incident,
wherein the X-ray irradiation unit is configured to focus on a specific measurement target element selected as a measurement target from the plurality of elements contained in the sample and an adjacent element, from the plurality of elements contained in the sample, having an energy absorption edge value larger than an energy absorption edge value of the specific measurement target element, and irradiate the sample with X-rays having energy values, which are larger than the energy absorption edge value of the specific measurement target element and are equal to or less than the energy absorption edge value of the adjacent element,
wherein with respect to a measurement target element for which there is no adjacent element having a larger energy absorption edge value among a plurality of other measurement target elements selected as measurement targets from the plurality of elements contained in the sample, the X-ray irradiation unit is configured so that the sample is also irradiated with X-rays having an energy value larger than an energy absorption edge value of the measurement target element,
wherein the X-ray detection unit comprises a plurality of X-ray detectors and X-ray shielding doors, and the plurality of X-ray detectors are arranged around an X-ray irradiation site of the sample to be irradiated with X-rays from the X-ray irradiation unit in such a posture as to take the fluorescent X-rays emitted from the sample, each X-ray shielding door of the X-ray shielding doors for shielding X-rays is provided between the sample and each of the plurality of X-ray detectors so as to be freely openable and closable, and wherein the controller is configured to close X-ray shielding doors for X-ray detectors among the plurality of X-ray detectors having detected X-rays diffracted from the sample.

3. A fluorescent X-ray analysis apparatus comprising:

an X-ray irradiation unit for irradiating a sample containing a plurality of elements with X-rays;

an X-ray detection unit for detecting fluorescent X-rays emitted from the sample; and an analysis unit, wherein the X-ray irradiation unit comprises an X-ray source for emitting continuous X-rays, and a multi-wavelength mirror to which the continuous X-rays emitted from the X-ray source are incident, wherein the X-ray irradiation unit is configured to focus on a specific measurement target element selected as a measurement target from the plurality of elements contained in the sample and an adjacent element, from the plurality of elements contained in the sample, having an energy absorption edge value larger than an energy absorption edge value of the specific measurement target element, and irradiate the sample with X-rays having energy values, which are larger than the energy absorption edge value of the specific measurement target element and are equal to or less than the energy absorption edge value of the adjacent element, wherein with respect to a measurement target element for which there is no adjacent element having a larger energy absorption edge value among a plurality of other measurement target elements selected as measurement targets from the plurality of elements contained in the sample, the X-ray irradiation unit is configured so that the sample is also irradiated with X-rays having an energy value larger than an energy absorption edge value of the measurement target element, wherein the X-ray detection unit comprises a plurality of X-ray detectors, and the plurality of X-ray detectors are arranged around an X-ray irradiation site of the sample to be irradiated with X-rays from the X-ray irradiation unit in such a posture as to take the fluorescent X-rays emitted from the sample, and wherein the analysis unit is configured to exclude detection signals from X-ray detectors among the plurality of X-ray detectors having detected X-rays diffracted from the sample, and perform a fluorescent X-ray analysis based on detection signals from the other X-ray detectors among the plurality of X-ray detectors.

4. A fluorescent X-ray analysis method comprising:

irradiating a sample containing a plurality of elements with X-rays;

detecting fluorescent X-rays emitted from the sample; and focusing on a measurement target element selected as a measurement target from the plurality of elements contained in the sample and an adjacent element, from the plurality of elements contained in the sample, having an energy absorption edge value larger than an energy absorption edge value of the measurement target element to irradiate the sample with X-rays having energy values, which are larger than the energy absorption edge value of the measurement target element and are equal to or less than the energy absorption edge value of the adjacent element.

5. A fluorescent X-ray analysis method comprising:

irradiating a sample containing a plurality of elements with X-rays;

detecting fluorescent X-rays emitted from the sample;

focusing on a specific measurement target element selected as a measurement target from the plurality of elements contained in the sample and an adjacent element, from the plurality of elements contained in the sample, having an energy absorption edge value larger than an energy absorption edge value of the specific measurement target element to irradiate the sample with X-rays having energy values, which are larger than the energy absorption edge value of the specific measurement target element and are equal to or less than the energy absorption edge value of the adjacent element; and with respect to a measurement target element for which there is no adjacent element having a larger energy absorption edge value among a plurality of other measurement target elements selected as measurement targets from the plurality of elements contained in the sample, irradiating the sample with X-rays having an energy value larger than an energy absorption edge value of the measurement target element.

6. The fluorescent X-ray analysis method according to claim 5, wherein a solder containing elements of Ag and Sn is used as a sample, each of the elements of Ag and Sn is selected as a measurement target element and measured, and the sample is irradiated with X-rays having energy values, which are larger than an energy absorption edge value of Ag selected as the measurement target element, and are equal to or less than an energy absorption edge value of Sn, which is an adjacent element having an energy absorption edge value larger than the energy absorption edge value of the Ag, and X-rays having energy values, which are larger than the energy absorption edge value of Sn selected as the measurement target element.

* * * * *